(12) United States Patent
Ueda et al.

(10) Patent No.: US 11,680,342 B2
(45) Date of Patent: Jun. 20, 2023

(54) INDUSTRIAL TWO-LAYERED FABRIC

(71) Applicant: NIPPON FILCON CO., LTD., Tokyo (JP)

(72) Inventors: Ikuo Ueda, Shizuoka (JP); Teppei Hashiguchi, Shizuoka (JP)

(73) Assignee: NIPPON FILCON CO., LTD., Tokyo (JP)

( * ) Notice: Subject to any disclaimer, the term of this patent is extended or adjusted under 35 U.S.C. 154(b) by 0 days.

(21) Appl. No.: 16/331,091

(22) PCT Filed: Sep. 6, 2016

(86) PCT No.: PCT/JP2016/076075
§ 371 (c)(1),
(2) Date: Mar. 6, 2019

(87) PCT Pub. No.: WO2018/047217
PCT Pub. Date: Mar. 15, 2018

(65) Prior Publication Data
US 2019/0203387 A1    Jul. 4, 2019

(51) Int. Cl.
*D03D 11/00* (2006.01)
*D21F 1/10* (2006.01)
(Continued)

(52) U.S. Cl.
CPC .............. *D03D 11/00* (2013.01); *B32B 5/024* (2013.01); *D21F 1/0036* (2013.01); *D21F 1/10* (2013.01);
(Continued)

(58) Field of Classification Search
CPC ............ D03D 11/00; D03D 2700/0111; D03D 2700/0174; D21F 1/10; D21F 1/0036;
(Continued)

(56) References Cited

U.S. PATENT DOCUMENTS

| 3,885,603 A | * | 5/1975 | Slaughter | .............. D21F 1/0036 |
| | | | | 139/425 A |
| 4,501,303 A | | 2/1985 | Osterberg | |

(Continued)

FOREIGN PATENT DOCUMENTS

| EP | 0 069 101 A2 | 1/1983 |
| EP | 2 194 186 A1 | 6/2010 |

(Continued)

OTHER PUBLICATIONS

International Search Report issued in Application No. PCT/JP2016/076075, dated Nov. 22, 2016.
(Continued)

*Primary Examiner* — Elizabeth Mary Cole Imani
(74) *Attorney, Agent, or Firm* — Michael Best & Friedrich LLP

(57) ABSTRACT

[Task] The object of the present invention is to provide an industrial two-layered fabric with a long durability which exhibits an excellent surface smoothness and excellent marking characteristics, while at the same time improving wear resistance characteristics to balance warps and wefts. [Solution to the Task] An industrial two-layered fabric formed by binding yarns, diameters of all of the upper surface side warps are set to be the same, diameters of all of the lower surface side warps are set to be the same, diameters of the lower surface side warps are set to be larger than diameters of said upper surface side warps, and at least one, or more than one of said upper surface side warps are woven with said lower surface side wefts to constitute binding yarns binding said at least one upper surface side fabric and said at least one lower surface side fabric.

12 Claims, 2 Drawing Sheets

(51) Int. Cl.
  *B32B 5/02* (2006.01)
  *D21F 1/00* (2006.01)
  *D21F 7/08* (2006.01)
(52) U.S. Cl.
  CPC .......... *D21F 7/083* (2013.01); *B32B 2250/02* (2013.01); *B32B 2262/02* (2013.01); *D10B 2505/00* (2013.01)
(58) Field of Classification Search
  CPC ....... D21F 7/083; D21F 1/0045; B32B 5/024; B32B 2250/02; B32B 2262/02; D10B 2505/00
  See application file for complete search history.

(56) References Cited

U.S. PATENT DOCUMENTS

| | | | |
|---|---|---|---|
| 4,821,780 | A | 4/1989 | Tate |
| 7,959,764 | B2 * | 6/2011 | Ringer .................. D21F 3/0272 |
| | | | 162/358.5 |
| 2004/0182465 | A1 | 9/2004 | Ward |
| 2007/0128414 | A1 | 6/2007 | Nakajima |
| 2013/0105030 | A1 | 5/2013 | Heger |

FOREIGN PATENT DOCUMENTS

| | | |
|---|---|---|
| JP | S58-018496 A | 2/1983 |
| JP | S63-145496 A | 6/1988 |
| JP | 2001-288612 A | 10/2001 |
| JP | 2004-156164 A | 6/2004 |
| JP | 2006-057216 A | 3/2006 |
| JP | 2006-520860 A | 9/2006 |
| JP | 2007-119957 A | 5/2007 |
| JP | 2007-182663 A | 7/2007 |
| JP | 2013-517388 A | 5/2013 |
| WO | WO-2014/202277 A1 | 12/2014 |

OTHER PUBLICATIONS

Office Action issued in Japanese Application No. 2018-537743, dated May 14, 2020.

Extended Search Report issued in European Application No. 16915637.9, dated Mar. 30, 2020.

Examination report issued in European Patent Application No. 16915637.9-1016, dated Nov. 30, 2020.

Decision of Refusal issued in Japanese Patent Application No. 2018-537743, dated Jun. 29, 2021.

* cited by examiner

INDUSTRIAL TWO-LAYERED FABRIC

This Application is a 371 of PCT/JP2016/076075 filed Sep. 6, 2016.

TECHNICAL FIELD OF THE INVENTION

The present invention relates to an industrial two-layered fabric with a long durability which exhibits an excellent surface smoothness and an excellent marking characteristics, while at the same time balancing warps and wefts.

BACKGROUND ART

Fabrics obtained by weaving warps and wefts have conventionally been used widely as an industrial two-layered fabric. They are, for example, used in various fields including papermaking fabrics, conveyor belts and filter cloths and are required to have fabric properties suited for the intended use or using environments. Of such fabrics, a papermaking fabric used in a papermaking step for removing water from raw materials by making use of the network of the fabric must satisfy a severe demand.

For example, there is a demand for the development of fabrics which do not transfer a wire mark of the fabric and therefore have excellent surface property, the ones which have enough hydration property for sufficiently and uniformly hydrating excess water contained in the material and enough rigidity or wear resistance to be usable desirably even under severe environments, or the ones which are capable of maintaining conditions necessary for making good paper for a prolonged period of time.

In addition, a fiber supporting property, improvement in a paper making yield, dimensional stability and running stability are demanded.

In recent years, owing to the speed-up of a paper making machine, requirements for papermaking fabrics have become even severe.

Since most of the demands for industrial fabrics and solutions thereof can be understood if papermaking fabrics on which the most severe demand is imposed among industrial fabrics is described, the papermaking fabric will hereinafter be described as a representative example.

Recently, particularly excellent hydration property and surface smoothness have been required due to the high speed operation of a machine for fabric. Although the required hydration property varies in accordance with the machine and the product papers, the uniform hydration property and the fiber supportability are commonly required for all the product papers. In addition, the fiber supportability is considered to be crucial, since old papers in which much fine fibers are contained has been increasingly used in recent years, and the fabric with an excellent hydration property has become required, since the hydration property is decreased upon the formation of the sheet with much fine fibers contained therein.

Further, in the fabric for producing papers, a hydration operation in a centrifugal or a pressing manner is generally conducted by utilizing a network of the fabric, however, water is sucked to be hydrated from an underside of the network in order to obtain a sufficient hydration property, so that the required properties such as the fiber supportability, the hydration property influences much on the operation or the cost for producing papers.

In this connection, it is publicly known that the diameters of the upper surface side warps and the upper surface side wefts may be preferably reduced, while at the same time, the number of the yarns may be preferably increased in order to improve the surface smoothness of such an industrial two-layered fabric.

On the other hand, it is publicly known that the diameters of the lower surface side wefts arranged to be the running side which contacts the machine may be preferably increased in order to improve the wear resistance. However, it is widely known that the balance of the lower surface side fabric layer can be worsened by the fact that the diameter of the lower surface side weft larger than that of the lower surface side warp due to the thickening of the lower surface side weft.

Here, the industrial fabric in which the diameter of each of two kinds of yarns, that is, the lower surface side warps and the lower surface wefts constituting the lower surface side fabric is set to be larger than the diameter of each of the upper surface side warps and the upper surface wefts opposed to the lower surface side warps and the lower surface wefts has been developed (refer to Patent Publication 1). A technical problem of the wear resistance is considered to be solved by using such an industrial fabric.

However, the industrial fabric disclosed in the Patent Publication 1 is the one in which the upper surface side fabric layer and the lower surface side fabric layer are bound by the wefts. Accordingly, a technical problem which arises in a case where the industrial two-layered fabric is bound by the warps is not taken into account. If the diameters of yarns only constituting the lower surface side fabric are made large and the industrial fabric is bound by the warps in the industrial fabric disclosed in the Patent Publication 1, the warps with small diameters and the warps with large diameters being woven with the upper surface side wefts from the lower surface side are mixed on the surface of the fabric. Therefore, since undulation due to the warps is caused to generated on the upper surface side fabric, the surface smoothness is deteriorated.

In addition, there is a risk in which the warps serving as binding yarns which are woven with the lower surface side wefts with large diameters can be cut with time. The tensions of the warps are high, as compared with the wefts, so that another technical problem in which the durability of the fabric can be worsened, since the cutting problem of the warps leads to the destruction of the fabric.

Such being the case, the present invention was made in order to solve the technical problem of the conventional technology such as the worsening of the surface smoothness, the deterioration of the durability of the fabric under the fabric with the diameter of the yarns on the lower surface side fabric being set to be larger than the diameter of the yarns on the upper surface side fabric.

Patent Publication 1: International Publication WO2014/202277

DISCLOSURE OF THE INVENTION

Technical Problems to be Solved by Present Invention

The object of the present invention is to provide an industrial two-layered fabric with a long durability which exhibits an excellent surface smoothness and excellent marking characteristics, while at the same time improving wear resistance characteristics to balance warps and wefts.

Means to Solve Technical Problems

The industrial fabric of the present invention includes following technical features in order to solve the above technical problems.

(1) An industrial two-layered fabric formed by binding at least one upper surface side fabric constituted by upper surface side warps and upper surface side wefts and at least one lower surface side fabric constituted by lower surface side warps and lower surface side wefts, by binding yarns, diameters of all of the upper surface side warps are set to be the same, diameters of all of the lower surface side warps are set to be the same, diameters of the lower surface side warps are set to be larger than diameters of said upper surface side warps, and at least one, or more than one of said upper surface side warps are woven with said lower surface side wefts to constitute binding yarns binding said at least one upper surface side fabric and said at least one lower surface side fabric.

Here, by setting the diameters of the lower surface side warps to be larger than the diameters of the upper surface side warps, the balance between the warps and the wefts can be improved, as compared with the lower surface side warps with small diameters. In particular, in a case where the diameters of the lower surface side warps are set to be larger than the diameters of the upper surface side warps in order to improve the wear resistance, the balance of the two-layered fabric can be improved. In addition, the cutting of the warps due to the wear can be reduced by setting the diameter of the lower surface side warps to be large, so that the two-layered fabric with an excellent durability can be provided.

Further, the worsening of the surface property can be prevented by adopting the binding yarns of only the upper surface side warps, not by adopting the binding yarns of the lower surface side warps. In particular, in the present invention, the upper surface side fabric with different diameters are not mixed by adopting all the lower surface side warps as the binding yarns, setting the diameters of all the upper surface side warps to be the same, and setting the diameters of all the lower surface side warps to be the same, so that the worsening of the surface property can be prevented, whereby the surface smoothness and the marking characteristics can be improved.

(2) The difference of the diameters between said upper surface side warps and said lower surface side warps may be set be within a range of the following equation.

the diameter of lower surface side warp ($f1$)/the diameter of upper surface side warp ($f2$)=1<$f1$/$f2$<=2

Here, in a case where the diameter of lower surface side warp (f1)/the diameter of upper surface side warp (f2) is smaller than, or equal to 1, the wear resistance cannot be improved, as compared the conventional fabric. In a case where the diameter of lower surface side warp (f1) the diameter of upper surface side warp (f2) is larger than 2, since the density of the warps on the upper surface side warps becomes too small, the surface property on the upper surface side fabric can be worsened.

In view of the above, it is more preferable that the diameter of lower surface side warp (f1)/the diameter of upper surface side warp (f2) be between 1.2 and 1.5.

(3) difference of the diameters between said lower surface side warps and said lower surface side wefts may be set be within a range of the following equation.

the diameter of lower surface side weft ($f3$) the diameter of lower surface side warp ($f1$)=1<($f3$/$f1$)<=2

Here, in a case where the diameter of lower surface side weft (f3) the diameter of upper surface side warp (f2) is smaller than or equal to 1, the quality can be deteriorated, in view of the wear resistance. In addition, in a case where the diameter of lower surface side weft (f3)/the diameter of upper surface side warp (f2) is larger than 2.5, since the diameter of the lower surface side weft becomes larger than that of the upper surface side warp, the balance of the lower surface side fabric can be worsened, and as a result, the total property of the industrial two-layered fabric can be deteriorated.

In vie of the above, it is more preferable that the diameter of lower surface side warp (f1)/the diameter of upper surface side warp (f2). binding yarn of the upper surface side warp and binding yarn of the lower surface side warp (f2) be between 1.2 and 2.3.

Effect of the Invention

According to the industrial two-layered fabric of the present invention, by adopting an industrial two-layered fabric with a long durability, an excellent surface smoothness and an excellent marking characteristics can be improved, while at the same time wear resistance characteristics can be improved.

DETAILED DESCRIPTION OF THE INVENTION

Figure 1:
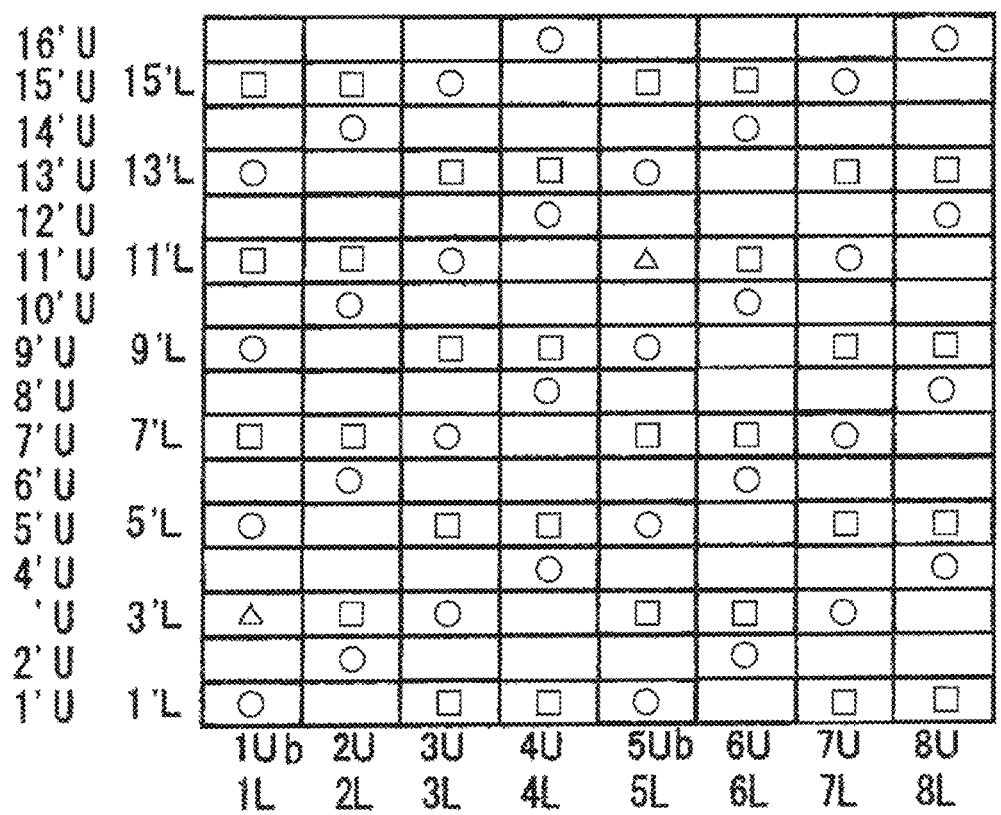
FIG. 1 is a design view of the industrial two-layered fabric according to the first embodiment of the present invention.

Now, the structure and the effect of the fabric of the present invention will be described below. Since the following embodiment is a mere example of the present invention, any embodiment which is not explicitly described below can be within the scope of the present invention.

The industrial two-layered fabric of this embodiment is constituted by binding the upper surface side fabric including the upper surface side warps and the upper surface side wefts and the lower surface side fabric including the lower surface side warps and the lower surface side wefts by means of the binding yarns.

No particular limitation is imposed on a yarn to be used in the present invention and it can be selected freely depending on the properties which an industrial fabric is desired to have. Examples of it include, in addition to monofilaments, multifilaments, spun yarns, finished yarns subjected to crimping or bulking such as so-called textured yarn, bulky yarn and stretch yarn, and yarns obtained by intertwining them. As the cross-section of the yarn, not only circular form but also square or short form such as stellar form, or elliptical or hollow form can be used. The material of the yarn can be selected freely and usable examples of it include polyester, polyamide, polyphenylene sulfide, polyvinylidene fluoride, polypropylene, aramid, polyether ketone, polyethylene naphthalate, polytetrafluoroethylene, cotton, wool and metal. Of course, yarns obtained using copolymers or incorporating or mixing the above-described material with a substance selected depending on the intended purpose may be used.

Here, in the fabric of the present invention, the diameters of all the upper surface side warps are set to be the same. In addition, the diameters of all the lower surface side warps are set to be same.

Further, the diameters of the lower surface side warps are set to be larger than the diameters of the upper surface side warps, so that the industrial fabric is formed by at least one, or more than one of the upper surface side warps being woven with the lower surface side wefts.

In a case where the diameters of the lower surface side wefts are set to be larger than the diameters of the upper surface side wefts, the balance of the two-layered fabric can be improved. In addition, the cutting of the warps due to their wear can be alleviated by setting the diameters of the lower surface side warps to be large, so that the two-layered fabric with a long durability can be provided.

Further, the worsening of the surface property can be prevented by adopting the binding yarns of only the upper surface side warps, not by adopting the binding yarns of the lower surface side warps. In particular, in the present invention, the upper surface side fabric with different diameters are not mixed by adopting all the lower surface side warps as the binding yarns, setting the diameters of all the upper surface side warps to be the same, and setting the diameters of all the lower surface side warps to be the same, so that the worsening of the surface property can be prevented, whereby the surface smoothness and the marking characteristics can be improved.

Figure 2:
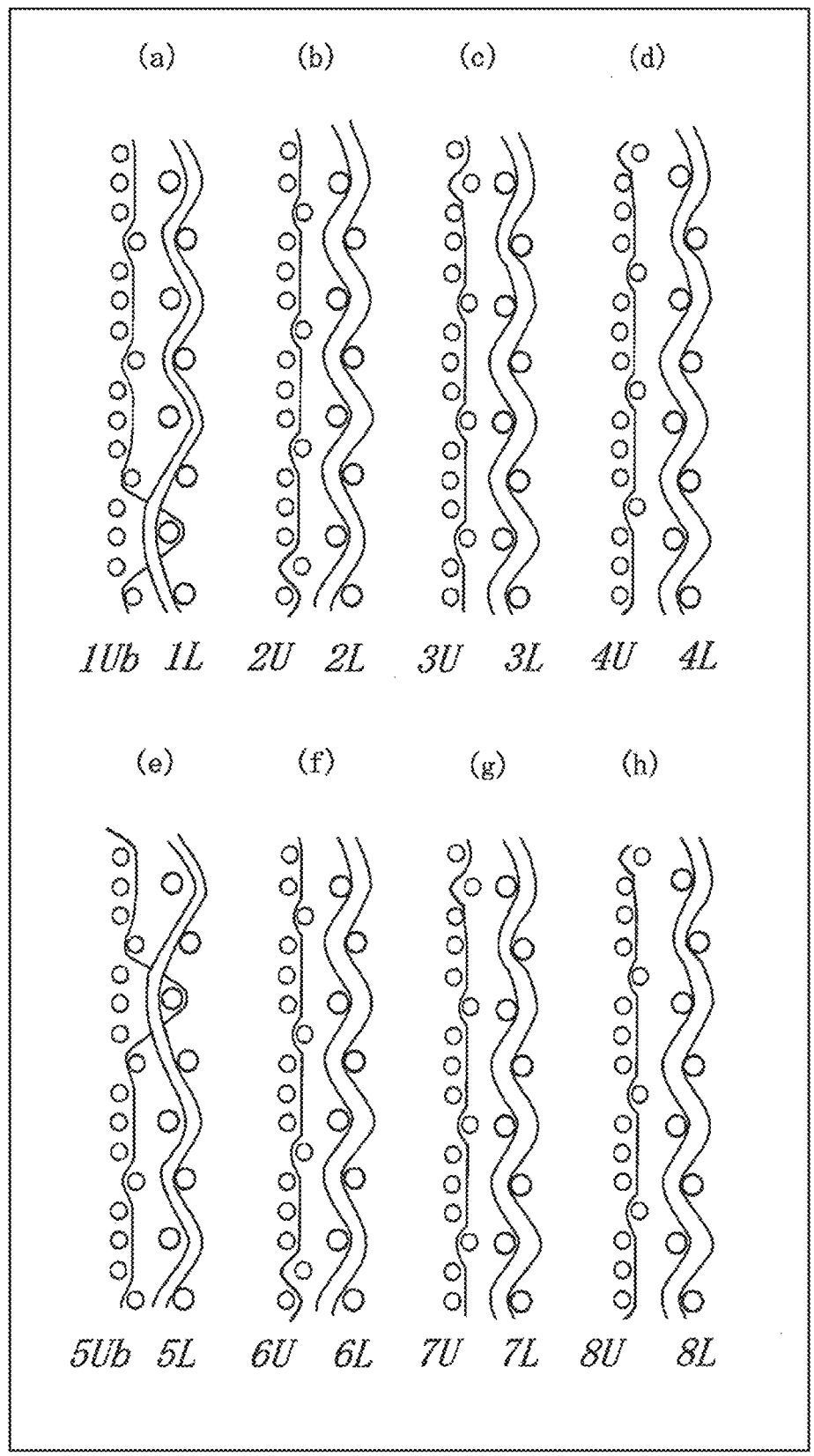
FIG. 2 is a longitudinal cross section view showing a structure of the yarns with respect to the industrial fabric according to the first embodiment of the present invention.

Now, the embodiments of the present invention will be described below with reference to the drawings. FIG. 1 is a design view of the industrial two-layered fabric according to the first embodiment of the present invention. FIG. 2 is a longitudinal cross section view showing a structure of the yarns with respect to the industrial fabric according to the first embodiment of the present invention.

Here, the design view corresponds to the complete structure of the fabric defining the minimum unit to be repeated of the fabric structure. A structure of the whole fabric is formed by the complete structures woven with each other in the upper and lower directions, and in the left and right directions. In addition, the longitudinal cross sectional view is the one showing a situation in which the warps are woven with each other in the complete structure. In each of the design views, the warp is indicated by a reference number such as 1, 2, 3 . . . . The warp binding yarn weaving the upper and lower wefts is indicated by the reference number to which b is attached. The upper and lower warps are indicated by the reference number to which U and L are attached, respectively. In each of the design views, the warps with the same reference numbers indicate to form a set, so that, in FIG. 1, the upper surface side warp U and the lower surface side warp L, the upper surface side binding yarn Ub and the lower surface side warp L form a set, respectively, for instance.

The weft is indicated by a reference number such as 1', 2', 3' . . . . There is a case in which the upper surface side wefts and the lower surface side wefts are arranged upper and lower, respectively, and there is another case in which the only upper surface side wefts are arranged upper, in accordance with an arrangement ratio of the wefts. The upper surface side wefts is indicated by the reference number to which U is attached, whereas, the lower surface side wefts is indicated by the reference number to which L is attached, 1'U, 1'L, etc., for instance.

In each of the design views, a symbol "☐" indicates that the lower surface side warp (L) is arranged below the lower surface side weft to form a knuckle, and a symbol "◯" indicates that the upper surface side warp (U) is arranged above the upper surface side weft to form a knuckle, and a symbol "△" indicates that the binding yarn of the upper surface side warp (Ub) is arranged below the lower surface side weft to form a knuckle. More specifically, all the symbols show a position where the upper surface side fabric and the lower surface side fabric area bound with each other.

In the design view, the warps and the wefts on the upper surface side are depicted to be precisely arranged over the warps and the wefts on the upper surface side, because of the clarity of the drawing. In the real fabric, it does not matter if they are arranged to be offset.

First Embodiment

FIGS. 1 to 2 are a design view and a cross section view showing an industrial two-layered fabric according to the first embodiment, respectively.

As shown in FIGS. 1 and 2, the industrial two-layered fabric of the first embodiment includes upper surface side warps (1U~8U), lower surface side warps (1L~8L), and upper surface side warps 1Ub, 5Ub each serving as a binding yarn. In this connection, the diameters of all the upper surface side warps (1U~8U) including the upper surface side warps 1U and 5Ub serving as the binding yarns are set to be same. In addition, the diameters of all the lower surface side warps (1L~8L) are set to be same.

As shown in FIG. 2, the technical feature of this embodiment is that the diameters of the lower surface side warps (1L~8L) are set to be larger than the diameters of the upper surface side warps (1U~8U). By adopting such a structure, the cutting of the warps due to their wear can be alleviated, so that the industrial two-layered fabric with an excellent durability can be provided.

Further, as shown in FIGS. 1 and 2, the industrial fabric of the first embodiment includes upper surface side wefts (1'U~16'U), and lower surface side wefts (1'L, 3'L, 5'L, 7'L, 9'L, 11'L, 13'L, 15'L) to form sixteen shafts.

An arranging ratio of the upper surface side wefts (1'U~16'U) to the lower surface side wefts (1'L, 3'L . . . ) is two.

In the first embodiment, as shown in FIG. 2, the upper surface side warps 1U~8U pass below the three upper surface side wefts and above the one upper surface side weft. In addition, the lower surface side warps 2L, 3L, 4L, 6L, 7L, 8L pass below the one lower surface side weft and above the one lower surface side weft in an alternate manner. Further, the lower surface side warp 1Lb which serves as the binding yarn passes above the upper surface side weft 1'U toward the lower surface side to pass below the lower surface side weft 5'L, the lower surface side weft 9'L and the lower surface side weft 13'L.

In addition, the upper surface side warp 1Ub serving as the binding yarn passes above the upper surface side weft 1'U toward the lower surface side to pass below the lower surface side wefts 3'L, and then, toward the upper surface side again to passes above the upper surface side weft 5'U to bind the upper surface side fabric and the lower surface side fabric, and then, passes below the upper surface side wefts 6'U~8'U to pass above the upper surface side weft 9'U and below the upper surface side wefts 10'U~12'U and then, passes above the upper surface side weft 13'U and below the upper surface side wefts 14'U 16'U.

In addition, as shown in FIG. 2, the upper surface side warp 5Ub serving as the binding yarn passes above the upper surface side weft 1'U to pass below the upper surface side wefts 2'U~4'U, and then, passes above the upper surface side weft 5'U to pass below the upper surface side wefts 6'U~8'U, and then, passes above the upper surface side weft 9'U toward the lower surface side to pass below the lower surface side wefts 11'L, and then, toward the upper surface side again to pass above the upper surface side weft 13'U to bind the upper surface side fabric and the lower surface side fabric, and then, passes below the upper surface side wefts 4'U~16'U.

In the industrial two-layered fabric of the first embodiment, by adopting such a structure, as shown in FIG. 2, the upper surface side fabric with the warps of different diameters are not adapted to be mixed with each other. As a result, the worsening of the surface property can be prevented, so that the surface smoothness and the marking characteristics can be improved.

1Ub, 5Ub upper surface side warp serving as binding yarn
2U~4U, 6U~8U upper surface side warp
1L~8L lower surface side warp
1'U~16'U upper surface side weft
1'L, 3'L, 5'L, 7'L, 9'L, 11'L, 13'L, 15'L lower surface side weft

What is claimed is:

1. An industrial two-layered fabric comprising:
   a surface side fabric constituted by upper surface side warps and upper surface side wefts; and
   a lower surface side fabric constituted by lower surface side warps and lower surface side wefts;
   diameters of all of the upper surface side warps are set to be the same,
   diameters of all of the lower surface side warps are set to be the same,
   diameters of the lower surface side warps are set to be larger than diameters of said upper surface side warps, and
   said upper surface side warps consist of first warps and second warps, said first warps are woven with said upper surface side wefts only, said second warps are woven with said upper surface side wefts and said lower surface side wefts;
   each one of the first warps or the second warps and each one of the lower surface side warps below the each one of the first warps or the second warps form a set;
   said each one of the lower surface side warps that forms the set with one of the second warps passes above one of the lower surface side wefts at a location where the one of the second warps passes below the one of the lower surface side wefts;
   a number of knuckles in which each of the second warps and each of the lower surface side warps that forms the set with the each of the second warps pass below the lower surface side wefts is the same as a number of knuckles in which each of the lower surface side warps that forms the set with one of the first warps passes below the lower surface side wefts.

2. The industrial two-layer layered fabric according to claim 1, wherein a difference of the diameters between said upper surface side warps and said lower surface side warps are set be within a range of the following equation:

the diameter of lower surface side warp ($f1$)/the diameter of upper surface side warp ($f2$)=1<$f1/f2$<=2.

3. The industrial two-layer layered fabric according to claim 1, wherein a difference of the diameters between said lower surface side warps and said lower surface side wefts are set be within a range of the following equation:

the diameter of lower surface side weft ($f3$)/the diameter of lower surface side warp ($f1$)=1<$f3/f1$<=2.

4. The industrial two-layer layered fabric according to claim 1, wherein a difference of the diameters between said upper surface side warps and said lower surface side warps are set be within a range of the following equation:

the diameter of lower surface side warp ($f1$)/the diameter of upper surface side warp ($f2$) =1.2<$f1/f2$<=1.5.

5. The industrial two-layer layered fabric according to claim 1, wherein a difference of the diameters between said lower surface side warps and said lower surface side wefts are set be within a range of the following equation:

the diameter of lower surface side weft ($f3$)/the diameter of lower surface side warp ($f1$) =1.2<$f3/f1$<=2.3.

6. The industrial two-layer layered fabric according to claim 1, wherein
   one of the second warps passes under one of the lower surface side wefts once only in a minimum repeated unit of the fabric.

7. The industrial two-layer layered fabric according to claim 1, wherein
   each of the second warps forms a knuckle at each of the locations on a lower surface of the lower surface side fabric.

8. The industrial two-layer layered fabric according to claim 6, wherein
   the one of the second warps forms a knuckle at a location on a lower surface of the lower surface side fabric where the one of the second warps passes under the one of the lower surface side wefts.

9. The industrial two-layer layered fabric according to claim 1, wherein
   said lower surface side warps, that form the sets with the second warps and pass above the lower surface side wefts at locations where the second warps pass below the lower surface side wefts, pass above lower surface side wefts adjacent to the lower surface side wefts at the locations.

10. The industrial two-layer layered fabric according to claim 9, wherein
    said lower surface side warps, that form the sets with the second warps and pass above the lower surface side wefts at locations where the second warps pass below the lower surface side wefts, pass above lower surface side wefts adjacent to both sides of the lower surface side wefts at the locations.

11. The industrial two-layer layered fabric according to claim 1, wherein in a repeated unit:
    the upper surface side warps pass below first plural number of the upper surface side wefts, pass above one of the upper surface side wefts and pass below second plural number of the upper surface side wefts.

12. The industrial two-layer layered fabric according to claim 1, wherein in a repeated unit:
    the upper surface side warps pass below first three of the upper surface side wefts, pass above one of the upper surface side wefts and pass below second three of the upper surface side wefts.

* * * * *